US010662553B2

United States Patent
Hiramoto et al.

(10) Patent No.: US 10,662,553 B2
(45) Date of Patent: May 26, 2020

(54) SPINNERET FOR ELECTROSTATIC SPINNING

(71) Applicants: JNC CORPORATION, Tokyo (JP); JNC FIBERS CORPORATION, Tokyo (JP)

(72) Inventors: Shimpei Hiramoto, Shiga (JP); You Umebayashi, Shiga (JP); Taiju Terakawa, Shiga (JP); Minoru Miyauchi, Shiga (JP)

(73) Assignees: JNC CORPORATION, Tokyo (JP); JNC FIBERS CORPORATION, Tokyo (JP)

( * ) Notice: Subject to any disclaimer, the term of this patent is extended or adjusted under 35 U.S.C. 154(b) by 124 days.

(21) Appl. No.: 15/501,437

(22) PCT Filed: Jul. 31, 2015

(86) PCT No.: PCT/JP2015/071821
§ 371 (c)(1),
(2) Date: Feb. 3, 2017

(87) PCT Pub. No.: WO2016/021503
PCT Pub. Date: Feb. 11, 2016

(65) Prior Publication Data
US 2017/0218538 A1 Aug. 3, 2017

(30) Foreign Application Priority Data

Aug. 5, 2014 (JP) .................................. 2014-159715
May 14, 2015 (JP) .................................. 2015-098719

(51) Int. Cl.
*D01D 5/00* (2006.01)

(52) U.S. Cl.
CPC ......... *D01D 5/0061* (2013.01); *D01D 5/0069* (2013.01)

(58) Field of Classification Search
CPC ...... D01D 4/02; D01D 5/0069; D01D 5/0061; D01D 5/04; D01D 5/0038; D01D 4/06;
(Continued)

(56) References Cited

U.S. PATENT DOCUMENTS 2,323,025 A * 6/1943 Formhals ............. D01D 5/0007
264/10
3,034,526 A * 5/1962 O'Brien ............... B01F 15/0264
137/1

(Continued)

FOREIGN PATENT DOCUMENTS

| CN | 101215762 | 7/2008 |
| CN | 101871130 | 10/2010 |

(Continued)

OTHER PUBLICATIONS

"International Search Report (Form PCT/ISA/210) of PCT/JP2015/071821", dated Nov. 2, 2015, with English translation thereof, pp. 1-4.

(Continued)

*Primary Examiner* — Joseph S Del Sole
*Assistant Examiner* — Jerzi H Moreno Hernandez
(74) *Attorney, Agent, or Firm* — JCIPRNET (57) ABSTRACT

A spinneret (1) for electrostatic spinning is configured from a structure of an electrically conductive metal material. The structure is provided with a long-axis direction (X), a short-axis direction (Z), and a thickness direction (Y). An inflow port (10) for a spinning starting material fluid is provided to one surface of the structure. A plurality of protrusions (5) are formed on another surface of the structure so as to be aligned along the long-axis direction (X). Each of the plurality of protrusion (5) extends so as to protrude from the structure. The protrusions (5) have, provided to apexes (2) thereof, discharge holes (4) for discharg- (Continued)

ing the starting material fluid. The pitch of the discharge holes (4) exceeds 1 mm.

2 Claims, 8 Drawing Sheets

(58) Field of Classification Search
CPC .. D04H 1/728; B29C 47/0021; B29C 47/0014
See application file for complete search history.

(56) References Cited

U.S. PATENT DOCUMENTS

| | | | | |
|---|---|---|---|---|
| 3,767,347 | A * | 10/1973 | Landoni | D01D 1/06 425/378.2 |
| 4,550,681 | A * | 11/1985 | Zimmer | B05C 5/0254 101/120 |
| 8,186,987 | B2 * | 5/2012 | Sumida | D01D 5/0061 425/174.8 E |
| 2002/0094352 | A1 * | 7/2002 | Guo | D01D 5/30 425/131.5 |
| 2004/0126454 | A1 * | 7/2004 | Haynes | B29C 47/70 425/382.2 |
| 2005/0017400 | A1 | 1/2005 | Clark | |
| 2005/0224998 | A1 * | 10/2005 | Andrady | D01D 5/0069 264/10 |
| 2005/0233021 | A1 | 10/2005 | Chun et al. | |
| 2007/0104812 | A1 | 5/2007 | Glawion et al. | |
| 2008/0241297 | A1 * | 10/2008 | Park | B82Y 30/00 425/131.5 |
| 2009/0224437 | A1 | 9/2009 | Fukuoka et al. | |
| 2011/0309014 | A1 * | 12/2011 | Hosoya | B01D 39/1623 210/500.1 |
| 2012/0013047 | A1 | 1/2012 | Ishikawa et al. | |
| 2013/0109264 | A1 | 5/2013 | Kobayashi et al. | |
| 2014/0342027 | A1 | 11/2014 | Ishikawa et al. | |

FOREIGN PATENT DOCUMENTS

| | | |
|---|---|---|
| EP | 2824225 | 1/2015 |
| JP | 63-075107 | 5/1988 |
| JP | 2005534828 | 11/2005 |
| JP | 2006152479 | 6/2006 |
| JP | 2007303031 | 11/2007 |
| JP | 2008174867 | 7/2008 |
| JP | 2008240231 | 10/2008 |
| JP | 2013047410 | 3/2013 |
| WO | 2007069381 | 6/2007 |
| WO | 2011142355 | 11/2011 |
| WO | 2013133056 | 9/2013 |

OTHER PUBLICATIONS

"Search Report of European Counterpart Application," dated Jan. 29, 2018, p. 1-p. 6, in which the listed reference was cited.
"Office Action of Japan Counterpart Application," with machine English translation thereof, dated Apr. 16, 2019, p. 1-p. 5.
"Office Action of China Counterpart Application," with machine English translation thereof, dated May 8, 2019, p. 1-p. 10.
"Office Action of Japan Counterpart Application," with English translation thereof, dated Nov. 12, 2019, p. 1-p. 5.

* cited by examiner

SPINNERET FOR ELECTROSTATIC SPINNING

CROSS-REFERENCE TO RELATED APPLICATION

This application is a 371 application of the international PCT application serial no. PCT/JP2015/071821, filed on Jul. 31, 2015, which claims the priority benefit of Japan application no. 2014-159715, filed on Aug. 5, 2014 and Japan application no. 2015-098719, filed on May 14, 2015. The entirety of each of the above-mentioned patent applications is hereby incorporated by reference herein and made a part of this specification.

BACKGROUND OF THE INVENTION

1. Field of the Invention

The present invention generally relates to a spinneret for electrostatic spinning. More specifically, the present invention relates to a spinneret which is suitable for stabilizing the continuous spinning of starting material fluids in a wide viscosity range and homogenizing the quality of nanofibers.

2. Description of Related Art

Ultrathin fibers, "nanofibers", are a one-dimensional nanomaterial which attracts much attention in recent years. In generalized definition, ultrathin fibers mean fibers which are 100 nm or less in diameter and 10 or more in aspect ratio, but, in practice, generally mean fibers which are 1000 nm or less in diameter (refer to non-patent document 1).

As a method for producing nanofibers, the electrostatic spinning method which utilizes electrostatic attraction is well-known.

In the general electrostatic spinning method, high voltage is applied on both a starting material fluid as a spinning solution with a dissolved polymer and an injection needle made of metal, and the front end of the injection needle injects out the starting material fluid toward the surface of a grounded collecting electrode. By a powerful electrical field generated by the electrical field concentration effect of the front end of the injection needle, the starting material fluid is attracted in a direction toward the surface of the collecting electrode to form a conical shape called Taylor cone. Moreover, when the force which is attracted to the surface of the collecting electrode due to the electrical field exceeds the surface tension of the starting material fluid, the starting material fluid flies out in the form of jet from the front end of the Taylor cone, and is thinned as solvent is volatilized, and thereby a fiber, the diameter of which is of sub-micron order, is collected in the shape of a non-woven fabric on the surface of the collecting electrode.

So far, the reported minimum fiber diameter of nanofibers produced by electrostatic spinning is about 100 nm. In the future, a high-precision and mass-production manufacturing technology for nanofibers with smaller fiber diameters will have to be established. In order to make the fiber diameter of nanofibers produced by the electrostatic spinning method smaller, it must be ensured that polymer chains in starting material fluid can hardly be entangled with one another. Therefore, decreasing the polymer concentration of the starting material fluid or choosing a low-molecular-weight polymer or the like to decrease the viscosity of the starting material fluid (refer to non-patent document 2) is effective.

On the other hand, for example, one of technical problems in the electrostatic spinning method is that when the viscosity of starting material fluid is low, the instability of the continuous spinning of nanofibers and the ununiformity of fiber diameter may cause a decrease in quality.

In order to solve the technical problems, for example, a plurality of fluid separation parts can be formed in a fluid supply device. For example, a production method for nanofibers (refer to patent document 1) which concentrates the minimum interval between the adjacent fluid separation parts into 1 mm or less is proposed.

In addition, a method (refer to patent document 2) which can inhibit ionic wind produced from the peripheral wall of a spinneret, etc. and the interference of an electrical field by means of two sides extending from the front end of the spinneret to sandwich discharge holes and improve the quality of nanofibers is also well-known.

DOCUMENTS OF THE PRIOR ART

Patent Documents

Patent Document 1: Japanese Unexamined Patent Application Publication No. 2006-152479
Patent Document 2: Japanese Unexamined Patent Application Publication No. 2013-47410

Non-Patent Document

Non-patent document 1: H. Matsumoto and A. Tanioka, "Membranes", 1 (3), 249-264 (2011)
Non-patent document 2: S. Imazumi, H. Matsumoto, et al., "Polym. J.", 41, 1124-1128 (2009)

SUMMARY OF THE INVENTION

Problems to be Solved by the Present Invention

However, guiding starting material fluid to triangular apexes by means of the surface tension of the fluid in the invention of patent document 1 is preferred in the case that the viscosity of starting material fluid is 5000 cP (centipoise) or more, but is not preferred for starting material fluid with viscosity lower than 5000 cP in spinning. Besides, if the interval between adjacent injection needles is reduced, then electrical fields generated around injection nozzles will interfere with one another, as a result, spinning nanofibers from all the injection needles becomes difficult, and there exists a worry about a decrease in the quality of the nanofibers.

In addition, in the invention of patent document 2, because discharge holes are configured at an opening, when electrostatic spinning is performed, conical Taylor cones which are formed nearby the discharge holes and contain starting material fluid expand gradually along the ridgeline of a spinneret, and therefore there is a worry that the adjacent Taylor cones may contact with one another. If the adjacent Taylor cones contact with one another to be merged together, the amount of the starting material fluid supplied to the merged Taylor cones becomes more than the amount of the starting material fluid supplied to the other Taylor cones around, and as a result, uniformly spinning nanofibers from all the Taylor cones becomes difficult. Especially, the lower the viscosity of the starting material fluid is, the easier the Taylor cones will expand around, and when a low-viscosity starting material fluid is used for producing nanofibers with smaller fiber diameter, the production of uniform nanofibers needs to be further improved.

The present invention provides a spinneret for electrostatic spinning which can use starting material fluids in a wide viscosity range from low viscosity to high viscosity to produce uniform nanofibers with low ununiformity in fiber diameter.

Technical Means for Solving the Problems

In a result of the repetitive hard research of the inventors for solving the problem, it is discovered that the problem can be solved by using the following spinneret for electrostatic spinning, so that the present invention is accomplished, and the spinneret for electrostatic spinning is provided with a plurality of protrusions which have discharge holes and a specific shape, and is provided with flow passages for distributing starting material fluid.

The structure of the present invention is described as follows:

[1] A spinneret for electrostatic spinning comprises a structure of an electrically conductive metal material, the structure is provided with a long-axis direction, a short-axis direction and a thickness direction, one surface of the structure is provided with an inflow port for a spinning starting material fluid, a plurality of protrusions are formed on another surface of the structure so as to be aligned along the long-axis direction, each of the plurality of protrusions extends so as to protrude from the structure, the protrusions have, provided to apexes thereof, discharge holes for discharging the starting material fluid, and the pitch of the discharge holes exceeds 1 mm.

[2] According to the spinneret for electrostatic spinning in [1], the height of each protrusion is 0.1 mm or more.

[3] According to the spinneret for electrostatic spinning in [1] or [2], the structure comprises two or ore parts, and adjoining planes of the parts are provided with flow passages for uniformly distributing the starting material fluid to each discharge hole.

[4] According to the spinneret for electrostatic spinning in any one of [1] to [3], the spinneret for electrostatic spinning comprises distributing plates for uniformly distributing the starting material fluid to each discharge hole, which are arranged in a body of the structure, wherein the distributing plates form the flow passages for the starting material fluid.

[5] According to the spinneret for electrostatic spinning in any one of [1] to [4], the inflow port is connected with each of the discharge holes by using the flow passages having approximately equal distances, and the differences between the distances of the flow passages from the inflow port to each of the discharge holes are within 10 percent.

Effects of the Invention

Since the spinneret for electrostatic spinning disclosed by the present invention is provided with the plurality of protrusions and starting material fluid is discharged out from the discharge holes which respectively run through each of the plurality of protrusions, starting material fluids in a wide viscosity range from low viscosity to high viscosity can be used to productively produce homogeneous and uniform nanofibers with low ununiformity in fiber diameter.

Further, the spinneret for electrostatic spinning which is provided with the flow passages inside cannot be easily affected by the difference between the specific gravities of the air and the starting material fluid, so that the starting material fluid can be supplied to each of the discharge holes without air getting into the spinneret, and therefore discharging can be performed stably.

In addition, the spinneret for electrostatic spinning which is provided with the flow passages inside and sets the distances from the inflow port to each of the discharge holes as approximately equal distances can uniformly supply the starting material fluid to each of the discharge holes, and thereby uniform nanofibers can be obtained.

In addition, when the height of each protrusion is set as 0.1 mm or more, preferably 1 mm or more, spinning can be more stabilized.

DESCRIPTION OF THE EMBODIMENTS

Hereinafter, a plurality of embodiments of a spinneret for electrostatic spinning disclosed by the present invention are illustrated as well as described in detail, but the specific structure of the spinneret for electrostatic spinning disclosed by the present invention is not limited to what is shown here.

Figure 1:
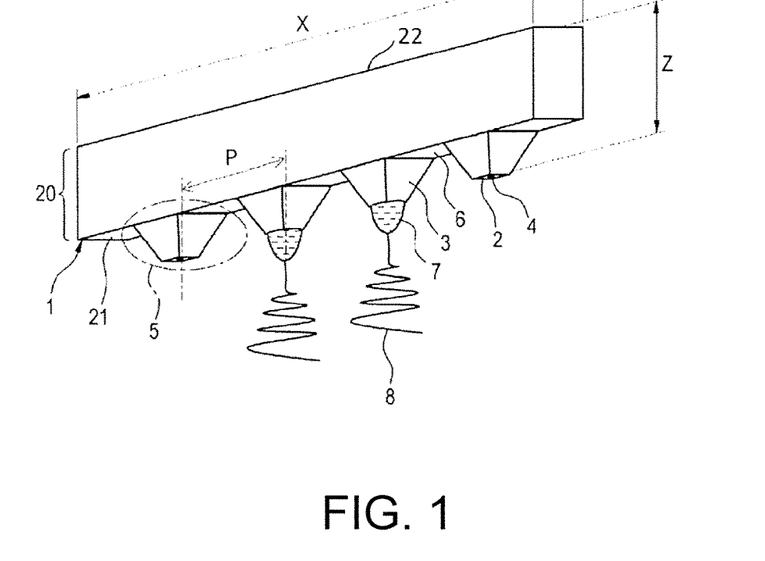
FIG. 1 is a three-dimensional diagram of a spinneret for electrostatic spinning having smooth cube-shaped protrusions.

FIG. 1 is a three-dimensional diagram of the spinneret for electrostatic spinning having smooth cube-shaped protrusions 5 (protrusions 5).

The spinneret 1 for electrostatic spinning in the present embodiment comprises a structure of an electrically conductive metal material. The structure comprises a body 20 which is formed by an X direction (also called a long-axis direction), a Y direction (also called a thickness direction) and a Z direction (also called a short-axis direction).

In the structure, part of the metal material forming the thickness direction (Y direction) extends so as to form the protrusions 5 along the short-axis direction (Z direction). In other words, on a second surface 21 (another surface) (forming one side of the body 20) opposite to a first surface 22 (one surface) of the body 20 of the structure, the plurality of protrusions 5 are formed so as to extend along the short-axis direction (Z direction). In addition, the body 20 means the part of the structure forming the spinneret 1 for electrostatic spinning excluding the protrusions 5.

Each protrusion 5 is provided with an apex (protruding apex) 2 and sides 3, one discharge hole 4 for discharging out starting material fluid is arranged in each apex 2. By charging the spinneret 1 for electrostatic spinning by a high voltage, Taylor cones 7 containing the starting material fluid are formed nearby the discharge holes 4, and nanofibers 8 are spun out from the front ends of the Taylor cones 7.

Since the spinneret 1 for electrostatic spinning in the present embodiment is provided with the protrusions 5 with the discharge holes 4, charges are concentrated at the protrusions 5 of the spinneret 1 for electrostatic spinning charged by high voltage, and powerful electrical fields are generated around the protrusions 5. Because of the powerful electrical fields, the force which is applied on the Taylor cones 7 and toward the surfaces of collecting electrodes increases, and thereby the expansion of the Taylor cones 7 and the contact between the adjacent Taylor cones are inhibited. In addition, because the spinneret 1 for electrostatic spinning is provided with a structure in which the protrusions 5 and valleys 6 are configured alternately along the long-axis direction (X direction), the Taylor cones 7 cannot easily expand along the sides 3 and the valleys 6 to the adjacent protrusions 5, and thereby the contact between the adjacent Taylor cones 7 is inhibited.

The spinneret 1 for electrostatic spinning only needs to contain the electrically conductive metal material, which can be any electrically conductive metal material such as iron, aluminum, stainless steel or brass. In addition, the spinneret 1 for electrostatic spinning can also contain the combination of a plurality of metal materials or alloy.

Every length of the spinneret 1 for electrostatic spinning in the long-axis direction, the thickness direction and the short-axis direction can be chosen arbitrarily. For example, the long-axis direction of the spinneret is in a range of 1500 mm or less, the thickness direction of the spinneret is in a range of 100 mm or less, and the short-axis direction of the spinneret is in a range of 150 mm or less. By setting the dimensions of the spinneret 1 for electrostatic spinning within the length ranges, the operation of mounting or demounting the spinneret onto or from an electrostatic spinning apparatus and the operation of maintaining the spinneret after spinning can be performed easily.

In the description, although a long-axis direction and a short-axis direction are referred to as described above, spinnerets having the same length in the width direction and the height direction are not excluded from the present invention. In addition, although the description describes "the Z direction is called a "short-axis direction" representing the height direction of the spinneret" and only illustrates the structures with the protrusions 5 protruding from the lower surfaces of the spinnerets, the protrusions 5 of these spinnerets only need to face toward the surface of the collecting electrodes from one side of the structure, the protrusions 5 can be used in a direction protruding toward the ground, or the protrusions 5 can be used so that the protrusions 5 are in horizontal direction or upward relative to the ground.

The number of the protrusions 5 of the spinneret 1 for electrostatic spinning in the present embodiment is not particularly limited, but is preferably 1000 or less. By setting the number of the protrusions 5 as 1000 or less, electrostatic repulsion cannot be easily generated between the Taylor cones 7 or the spun electrified nanofibers 8, and thereby the spinning of the nanofibers 8 becomes uniform.

Figure 2:
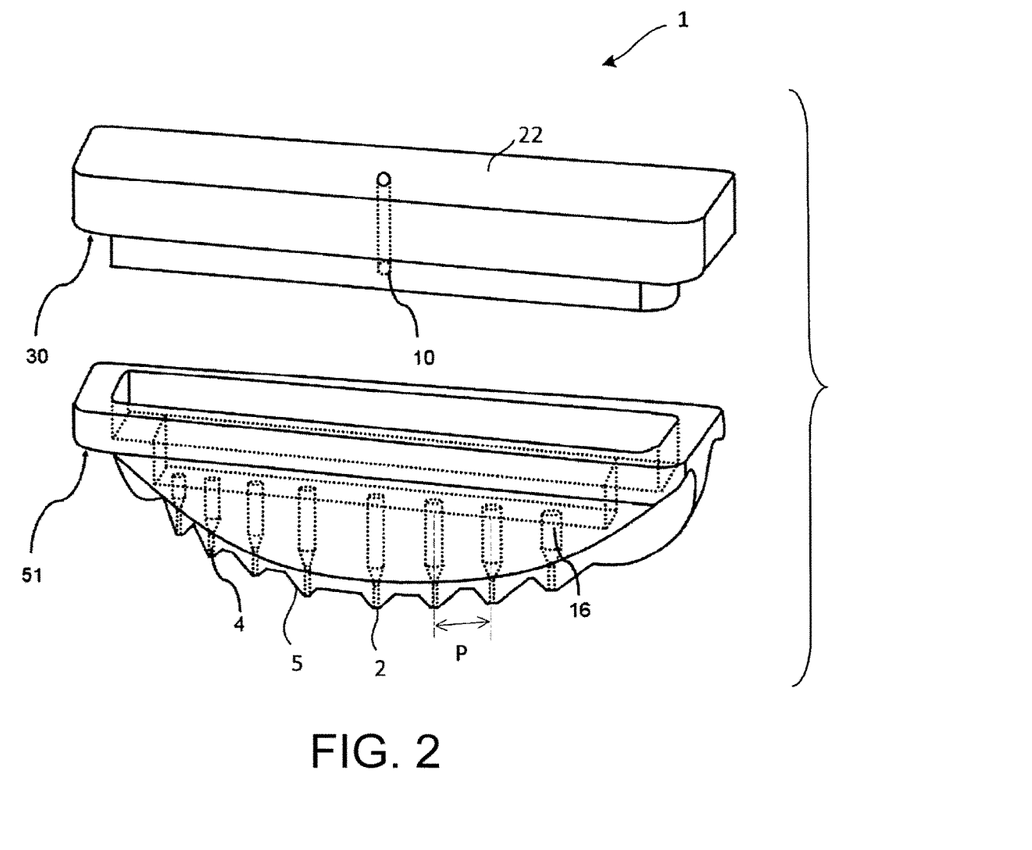
FIG. 2 is a three-dimensional diagram of the spinneret for electrostatic spinning having smooth cube-shaped protrusions in which the heights of the spinneret relative to the apexes 2 of the protrusions 5 are different between the adjacent protrusions.

FIG. 2 is a three-dimensional diagram of the spinneret 1 for electrostatic spinning in which the heights of the apexes 2 of the protrusions 5 are different between the adjacent protrusions. The spinneret 1 for electrostatic spinning in the present embodiment is obtained by connecting two parts, i.e. a top plate 30 and a nozzle 51, together. Guide holes 16 are arranged in pairs with the discharge holes in order to guide the starting material fluid to the discharge holes, and normally have a large aperture due to the fabrication and function of the spinneret.

Figure 3:
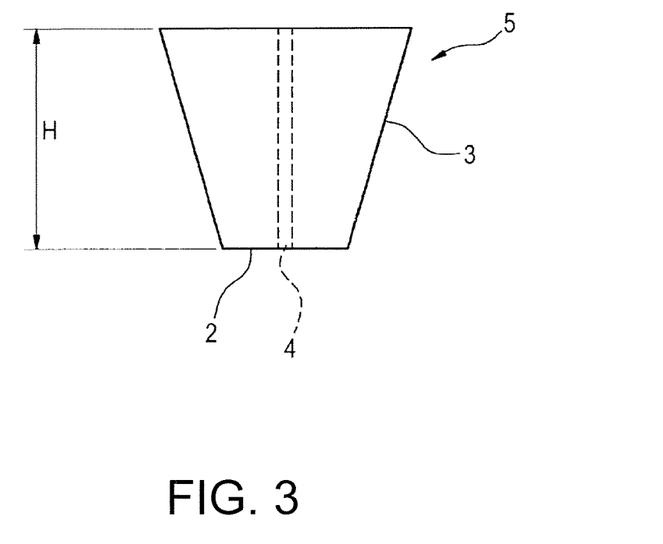
FIG. 3 is a sectional diagram of the smooth cube-shaped protrusion of the spinneret for electrostatic spinning.

FIG. 3 is a sectional diagram of the smooth cube-shaped protrusion 5 (protrusion 5) of the spinneret for electrostatic spinning. FIG. 3 especially represents the magnified protrusion 5 of the spinneret for electrostatic spinning in FIG. 1, which has a shape in bilateral line symmetry. Except the point that the protrusion 5 of the spinneret for electrostatic spinning in FIG. 2 is not in bilateral line symmetry, the protrusion 5 has the same structure as that shown in FIG. 3.

In the present invention, the height H (length in a direction H) of each protrusion 5 among the protrusions 5 of the spinneret 1 for electrostatic spinning is not particularly limited, but is preferably 0.1 mm or more. Since charges can be concentrated easily on pointed parts, charges can be concentrated easily at the front ends of the protrusions 5. As a result, even though the same voltage is applied, compared with a spinneret without protrusions 5, the electrical fields generated around the protrusions 5 become more powerful electrical fields, and thereby the behavior of the Taylor cones 7 is stable. By setting the height of the protrusions 5 as 0.1 mm or more, powerful electrical fields can be generated around the protrusions 5, and the force which attracts the Taylor cones 7 toward the surfaces of the collecting electrodes is increased. More preferably, the height of the protrusion 5 is 1 mm or more.

A configuration method for the protrusions 5 of the spinneret 1 for electrostatic spinning in the present embodiment is not particularly limited, and the protrusions 5 can be configured one-dimensionally according to the shape or dimensions of the spinneret 1 for electrostatic spinning, and can also be configured two-dimensionally so as to become parallel relative to the surfaces of the collecting electrodes. When configured one-dimensionally, the protrusions 5 can be configured in a way that the heights of the adjacent protrusions 5 are equal, as illustrated in FIG. 1, and can also be configured in a way that the heights of the adjacent protrusions 5 are different, as illustrated in FIG. 2. As illustrated, the protrusions 5 are arranged in bilateral symmetry from the center of the long-axis direction of the nozzle 51 in a way that the further away from the center of the long-axis direction of the nozzle 51 the protrusions 5 are configured, the smaller the heights (distance from the first surface 22 to the apex 2) of the apexes 2 of the protrusions 5 become, thus a uniform electrical field can be generated in each protrusion 5, so that the homogeneous nanofibers 8 can be obtained, and therefore this is preferred. Moreover, a case that the heights of the apexes of the adjacent protrusions are equal can also be included.

The surface direction of the surfaces becoming the apexes 2 of the protrusions 5 of the spinneret for electrostatic spinning is not particularly limited, but it is preferred that all the surfaces becoming the apexes 2 of the protrusions 5 are facing toward the same surface direction.

The shape of the protrusions 5 of the spinneret 1 for electrostatic spinning in the present embodiment is not particularly limited, but, if the stability of the Taylor cones 7 or the processing easiness or processing cost of the spinneret is taken into consideration, then a smooth cube shape is preferred. In addition, the protrusion 5 is not limited to the smooth cube shape for explanation, and various embodiments, such as a polyhedron, a semi-sphere, a cone, a polygonal column and a semi-cylinder, can be applied without departing from the scope of the subject matter. Preferably, the plurality of protrusions 5 have approximately the same shape.

When the spinneret for electrostatic spinning disclosed by the present invention is used for electrostatic spinning, not only can the spinneret be arranged in a way that the protrusions are in the vertical direction relative to collecting surfaces, so that starting material fluids spun out and nanofibers are collected in the vertical direction, but also the spinneret can be arranged in a way that the protrusions are in the horizontal direction relative to the collecting surfaces, so that the starting material fluid is spun out and nanofibers are collected in the horizontal direction.

The shape of the discharge holes 4 of the spinneret 1 for electrostatic spinning in the present embodiment is not particularly limited, any one of a round shape, a polygonal shape, a star shape, a Y shape, a C shape, etc. can be chosen, but, if the processing easiness of the spinneret is taken into consideration, then the round shape is more preferred. In addition, preferably, the plurality of discharge holes 4 have approximately the same shape.

In addition, a pitch P as the distance between each discharge hole 4 and the neighboring discharge hole shown in FIG. 1 and FIG. 2 is set so as to exceed 1 mm, and in order to guarantee such a pitch P, the plurality of protrusions 5 are formed so as to be aligned along the long-axis direction (X direction) of the structure. By guaranteeing the pitch P exceeding 1 mm, the contact of the Taylor cone 7 of the starting material fluid discharged from the neighboring discharge hole 4 is inhibited.

The area (including the area of the discharge hole) of the apex 2 of each protrusion 5 of the spinneret 1 for electrostatic spinning in the present embodiment is not particularly limited, but is preferably within a range from 0.1 mm$^2$ to 100 mm$^2$. By setting the area of the apex 2 as 0.1 mm$^2$ or more, the Taylor cones 7 can be kept reliably, the Taylor cones 7 can be inhibited from expanding around, and the contact between the adjacent Taylor cones 7 can be inhibited. By setting the area of the apex 2 as 100 mm$^2$ or less, the pitch P can be reduced, and the sufficient productivity of the nanofibers 8 can be maintained. More preferably, the area of the apex 2 is within a range from 1 mm$^2$ to 50 mm$^2$.

The aperture of each discharge hole 4 of the present embodiment is not particularly limited, but is preferably set as 0.1 mm to 1.0 mm. By setting the aperture of each discharge hole 4 as 0.1 mm or more, the cleanability of the spinneret for electrostatic spinning is increased, and therefore is preferred. In addition, by setting the aperture of each discharge hole 4 as 1.0 mm or less, in the case of low-viscosity starting material fluid or low discharging amount, the Taylor cones 7 show a stable behavior, the spinning of the nanofibers 8 becomes uniform, and therefore is preferred.

The position of the discharge hole 4 configured at each apex 2 of the spinneret 1 for electrostatic spinning in the present embodiment is not particularly limited as long as the discharge hole 4 is configured at the apex 2, for example, the discharge hole 4 is configured at the center, the periphery or etc. of the surface of the apex 2, but is preferably configured at the center of the apex 2. Since the discharge hole 4 is adopted as the center and the Taylor cone 7 is formed along the surface of the apex 2, the Taylor cones 7 show a stable behavior, and thereby the uniform nanofibers 8 can be obtained.

Figure 4:
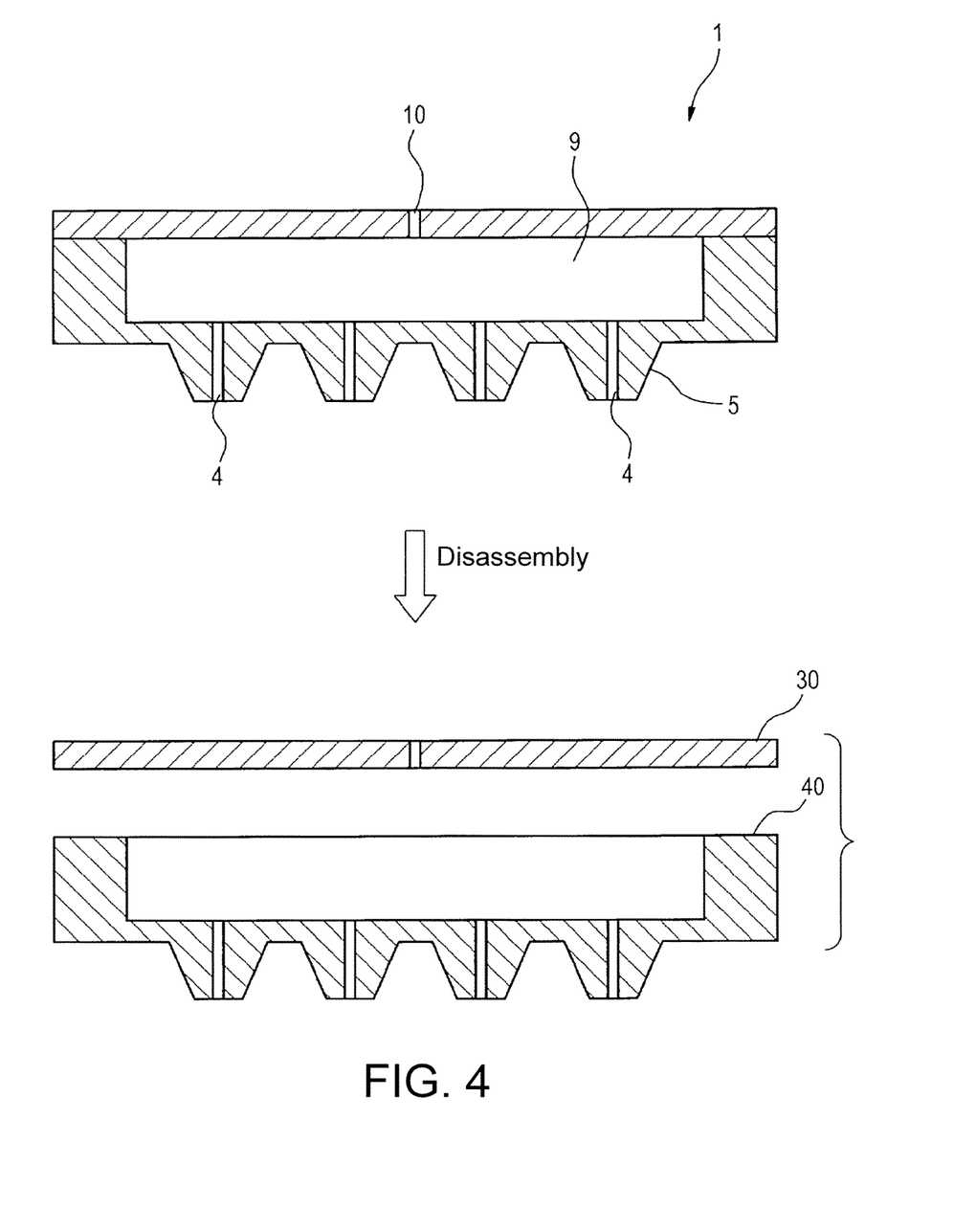
FIG. 4 is a sectional diagram of the spinneret for electrostatic spinning having an internal space for storing starting material fluid inside and structural parts thereof.

FIG. 4 is a sectional diagram of the spinneret for electrostatic spinning having an internal space for storing starting material fluid inside. As shown in FIG. 4, the spinneret 1 for electrostatic spinning in the present embodiment is obtained by connecting two parts, i.e. the top plate 30 and the nozzle 40, together. However, the parts composing the spinneret 1 for electrostatic spinning are not limited to such a form.

The spinneret 1 for electrostatic spinning in the present embodiment supplies starting material fluid for spinning from an inflow port 10 arranged in the first surface 22. The starting material fluid supplied from the inflow port 10 is stored in the internal space 9 in the spinneret, and is discharged out from the discharge holes 4 which perforate through the bottom surface of the internal space 9 and run through the protrusions 5. When high-viscosity starting material fluid is used, the internal pace 9 serves as a buffer area, so the starting material fluid can be discharged out uniformly from each discharge hole. In addition, since the structure of the spinneret is simple, the cleaning step or maintenance can be performed easily after spinning.

A starting material fluid supplying method of the spinneret 1 for electrostatic spinning in the present embodiment is not particularly limited, but examples thereof include a gear pump, a syringe pump, supply utilizing pressurization on solution, etc. Although the gear pump is difficult to maintain, e.g., it takes time to disassemble and clean the gear pump, the gear pump has the advantage that starting material fluid can be supplied continuously. In addition, the syringe pump is of a batch type, the amount of starting material fluid which is supplied each time is limited, but it is possible to supply starting material fluids with wider viscosity range than gear pump. A choice can be made properly in correspondence to a starting material fluid to be used, production amount or maintainability.

Figure 5:
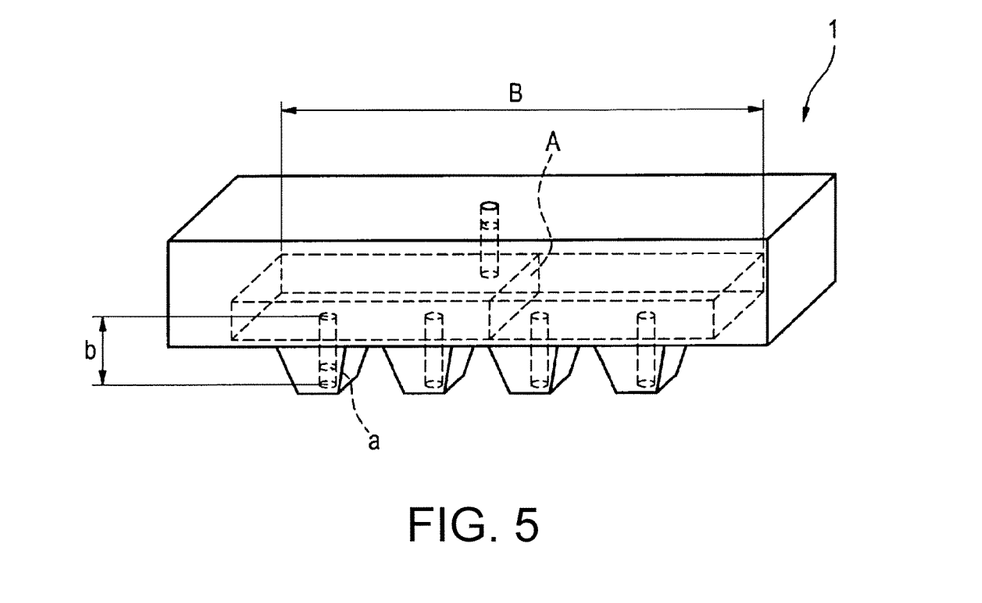
FIG. 5 is a three-dimensional diagram visualizing the internal space of the spinneret for electrostatic spinning having the internal space for storing starting material fluid inside.

FIG. 5 is a three-dimensional diagram visualizing the internal space of the spinneret for electrostatic spinning having the internal space for storing starting material fluid inside.

When the sectional area of the internal space 9 in a direction perpendicular to the long-axis direction of the spinneret is set as A, the length of the internal space 9 in the long-axis direction of the spinneret is set as B, the sectional area of the discharge hole 4 is set as a, the length (the length of the nozzle running through from the internal space 9 to the outlet of the discharge hole) of the discharge hole 4 is set as b and the number of the discharge holes 4 perforate through the bottom surface of one internal space 9 is set as n, it is preferred that the volume of the internal space 9 and the area and length of the discharge hole 4 in the spinneret 1 for electrostatic spinning in the present embodiment meet the relation of the following formula (1). By setting the range meeting the formula (1), when the starting material fluid is supplied to each discharge hole 4, the fluidity of the starting material fluid toward the length direction of the discharges holes 4 exceeds the fluidity of the starting material fluid toward the long-axis direction of the internal space 9, back pressure in the spinneret 1 for electrostatic spinning rises, consequently, the starting material fluid can be supplied uniformly to each discharge hole 4 easily, and the spinning of the nanofibers 8 can easily become uniform.

$$\frac{B}{A^2} < \frac{b}{a^2 \times n} \quad (1)$$

Figure 6:
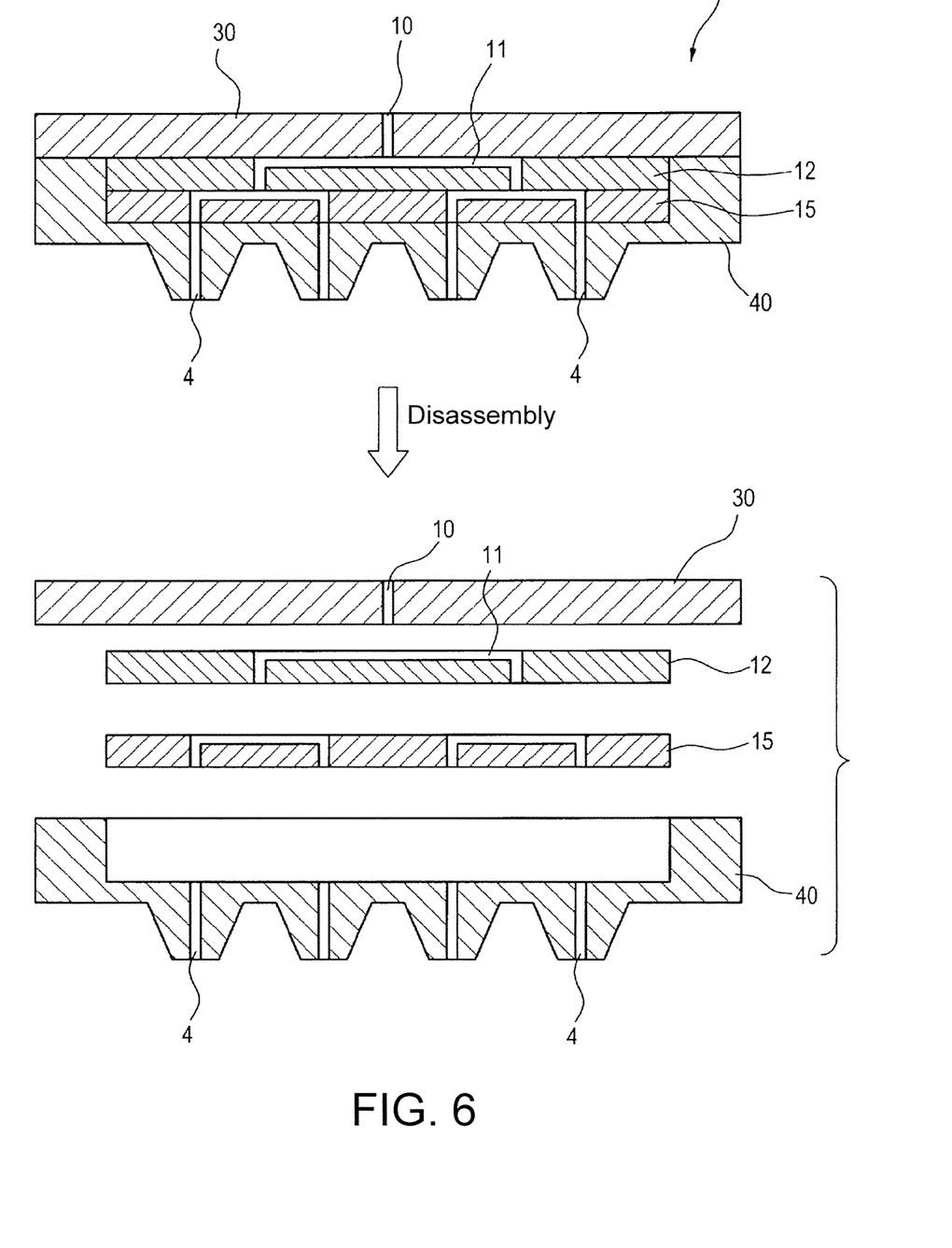
FIG. 6 is a sectional diagram of the spinneret for electrostatic spinning only containing flow passages for starting material fluid inside and structural parts thereof.

FIG. 6 is an example of a sectional diagram of the spinneret for electrostatic spinning having flow passages for starting material fluid inside and structural parts thereof.

The spinneret 1 for electrostatic spinning in the present embodiment can supply the starting material fluid to the plurality of discharge holes 4 from the inflow port 10. In order to distribute the starting material fluid to each discharge hole 4 from the inflow port 10, the internal space 9 can be arranged inside, but, in order to distribute the fluid, it is preferred to arrange a plurality of branched flow passages 11. If an ultralow-viscosity starting material fluid flows into the spinneret with the internal space 9, then in the process of loading the starting material fluid into the internal space 9, since the specific gravity of the starting material fluid is higher than that of the air, the starting material fluid is loaded into the internal space 9 as the air gets into the internal space 9, and as a result, the starting material fluid can hardly be supplied uniformly to each discharge hole 4. In addition, even if the starting material fluid is loaded without the air getting into the internal space 9, the distances from the inflow port 10 to each of the discharge holes are different, so it is hard to uniformly supply the starting material fluid to each discharge hole 4.

By forming the flow passages 11 in the spinneret 1 for electrostatic spinning, the difference between the specific gravities of the air and the starting material fluid cannot easily have an effect. Thus, the starting material fluid can be loaded into the internal space 9 without the air getting into the spinneret. Further, the distances from the inflow port to each of the discharge holes are approximately equal, consequently, the starting material fluid can be supplied uniformly to each discharge hole 4, and thereby the uniform nanofibers 8 can be obtained.

In terms of uniformly supplying the starting material fluid to each discharge hole 4, it is preferred that the difference between the distances from the inflow port 10 to each of the discharge holes 4 in the present embodiment, i.e. the difference between the distances of all the flow passages 11, is 10 percent or less. By setting the difference between the distances from the inflow port 10 to each of the discharge holes 4 as 10 percent or less, the difference between back pressures received by each of the discharge holes 4 is little, and thereby the affection of the difference between the discharging amount of the starting material fluid from each of the discharge holes 4 on the nanofibers 8 can be inhibited.

The shape of each flow passage 11 of the present embodiment is not particularly limited, but in terms of efficiently and uniformly supplying the starting material fluid to each discharge hole 4 according to a result of analysis on the relation between the shape of the flow passage 11 and the fluidity of the starting material fluid, the shape of branch diagrams illustrated in FIG. 6 is preferred. In addition, as shown in the lower half part of FIG. 6, the spinneret 1 for electrostatic spinner in the present embodiment is obtained by connecting a distributing plate 12 and a distributing plate 15 in addition to the top plate 30 and the nozzle 40, four parts in total. The flow passages 11 are formed in all the parts and the adjoining planes, and thereby the flow passages 11 can be formed easily.

Figure 7:
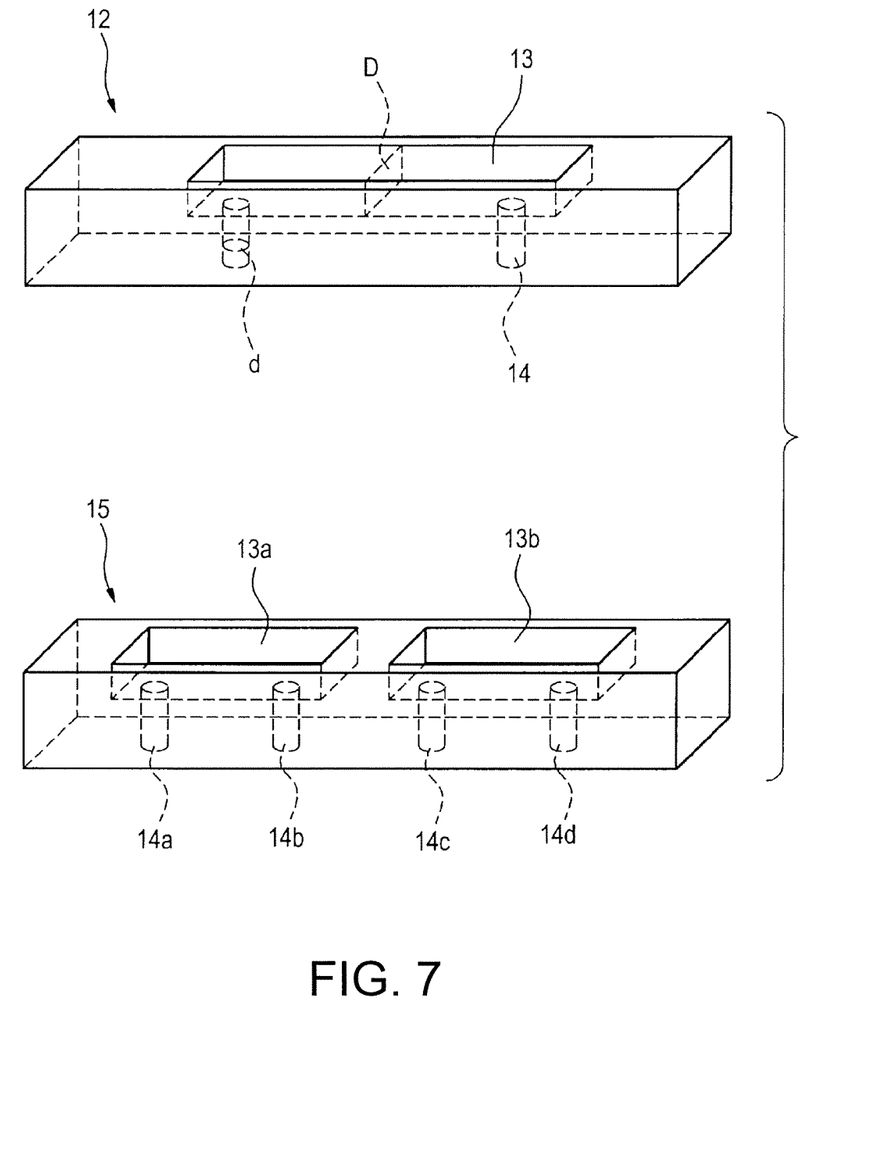
FIG. 7 is a three-dimensional diagram of distributing plates for forming the flow passages for starting material fluid in the spinneret for electrostatic spinning.

FIG. 7 is a three-dimensional diagram of the distributing plate 12 and the distributing plate 15 for forming the flow passages for starting material fluid in the spinneret 1 for electrostatic spinning.

In the spinneret 1 for electrostatic spinning in the present embodiment, in order to form the flow passages 11 inside, the detachable distributing plate 12 and distributing plate 15 illustrated in FIG. 6 and FIG. 7 are arranged. The distributing plate 12 is provided with a recess 13 formed by digging the surface (adjoining plane) and holes 14 running through the thickness direction of the distributing plate 12 in the recess, which are configured to make fabrication and spinneret cleaning easy. The flow passages 11 can be formed by arranging the distributing plate 12, the spinneret can be disassembled into the nozzle 40, the distributing plate 12 and the distributing plate 15 after spinning, and thus, the step of cleaning the spinneret can be carried out easily and effectively. In addition, by fabricating a plurality of distributing plates (such as the distributing plate 15) with different shapes of recesses and holes of the distributing plate 12 in advance, a distributing plate 12 which is suitable for the viscosity of a starting material fluid can be replaced with at any time, and thereby the spinneret can correspond to a wider viscosity range of starting material fluids.

With regard to the volume of the recess of the distributing plate and the area and length of each hole running through the recess, when the sectional area of the recess 13 of the distributing plate in a direction perpendicular to the flowing direction of the starting material fluid is set as D and the area of each hole 14 running through the recess of the distributing plate is set as d, in terms of efficiently and uniformly supplying the starting material fluid to each discharge hole 4 according to a result of analysis on the relation between the shape of flow passages 11 and the fluidity of the starting material fluid, it is preferred to set D as a range from 0.1 mm² to 5 mm² and d as a range from 0.1 mm² to 1 mm². If the ranges are met, then when starting material fluids, the viscosities of which are 10 cP to 5000 cP, are distributed, the air cannot get in the case of the low-viscosity starting material fluid, the back pressure of the high-viscosity starting material fluid cannot rise in excess as well, consequently, the starting material fluid can be easily supplied uniformly to each discharge hole 4, and the spinning of the nanofibers 8 can easily become uniform.

The distributing plate 15 is provided with a recess 13*a* and a recess 13*b* which are formed by digging the surface. A hole 14*a* and a hole 14*b* which run through the thickness direction of the distributing plate 15 are arranged in the recess 13*a*, and a hole 14*c* and a hole 14*d* are arranged in the recess 13*b*. For the same reason as D and d in the distributing plate 12, it is also preferred that each of the recess 13*a* and recess 13*b* of the distributing plate 15 meets the ranges.

Figure 8:
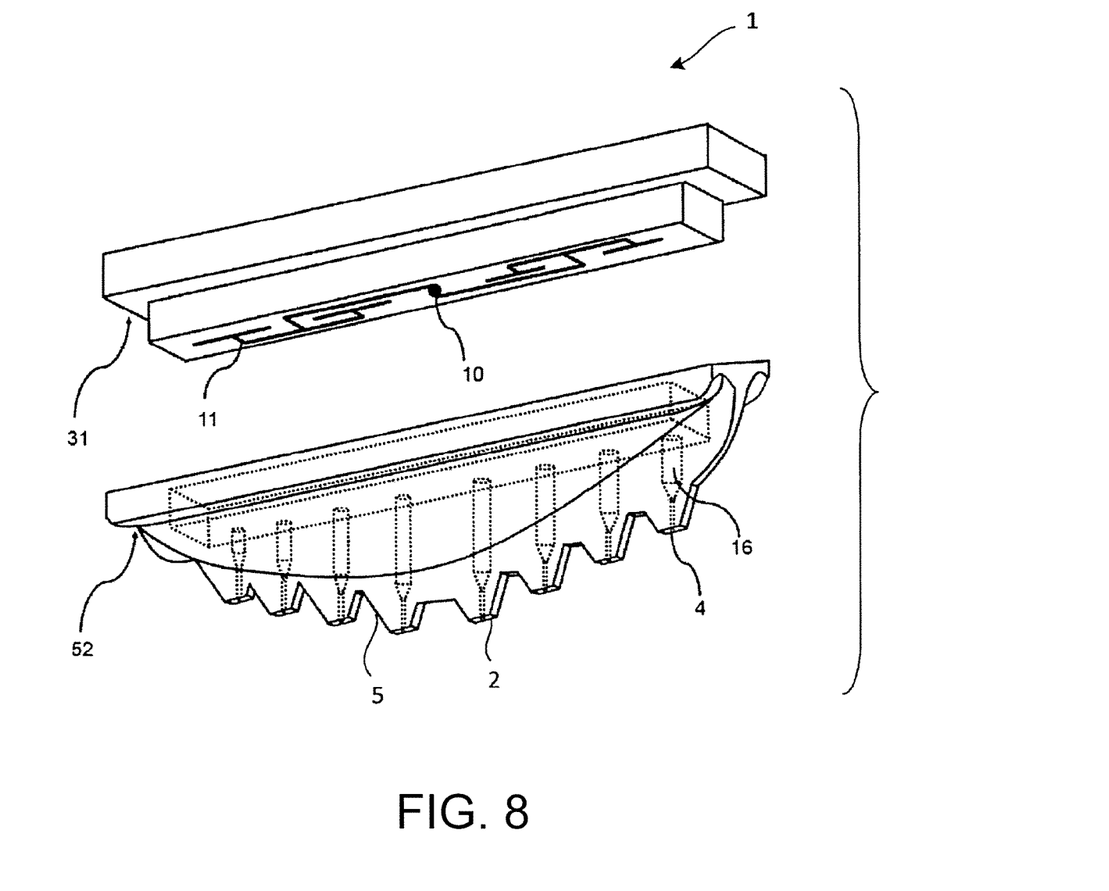
FIG. 8 is a three-dimensional diagram of the spinneret for electrostatic spinning having the smooth cube-shaped protrusions in which the heights of the spinneret relative to the apexes 2 of the protrusions 5 are different between the adjacent protrusions, corresponding to a top plate with a flow passage.

FIG. 8 is a three-dimensional diagram of the spinneret 1 for electrostatic spinning using a top plate 31 with flow passages. The spinneret 1 for electrostatic spinning in the present embodiment is obtained by connecting two parts, i.e. the top plate 30 and the nozzle 52, together.

In order to form the flow passages 11 in the spinneret 1 for electrostatic spinning in the present embodiment, the top plate 31 with the flow passages illustrated in FIG. 8 can also be used. When the top plate 31 with the flow passages 11 is used, in comparison with the case of using the distributing plates, the number of parts can be reduced, and the cleaning step or maintenance after spinning can be carried out easily.

When the spinneret 1 for electrostatic spinning in the present embodiment is used for electrostatic spinning, a material contained in a starting material fluid is not particularly limited, and can be chosen properly. As such a material, besides high polymer materials such as polyester, nylon, polyurethane, polyvinylidene difluoride, polyacrylonitrile, polyimide, polyamide, polysulfone, polyether sulfone, polyvinyl alcohol, polystyrene and polymethyl methacrylate, examples can also include an inorganic material, such as alumina or titanium oxide. A choice can be made properly in consideration of an effect appearing in nanofiber formation. In addition, these polymers can be used alone, or two or more types of polymers can be mixed for use. Further, these polymers can also be compounded with other functional materials, and as such functional materials, besides function-endowing materials such as flame retardant, deodorant, antioxidant, antistatic agent and pigments, examples can also include a nanomaterial, such as gold nanoparticles or titanium dioxide nanoparticles, hydroxyapatite nanoparticles, carbon nanotubes or graphene.

When the spinneret 1 for electrostatic spinning in the present embodiment is used for electrostatic spinning, a solvent contained in a starting material fluid is not particularly limited, and a solvent which can dissolve a polymer under room temperature or heating can be chosen properly. As such a solvent, N,N-dimethyl formamide, N,N-dimethylacetaide, N-methyl-2-pyrrolidone, tetrahydrofuran, tetramethylurea, trimethyl phosphate, 1,1,1,3,3,3-hexafluoro-2-propanol, hexafluoroacetic acid, methyl ethyl ketone, dimethyl sulfoxide, acetone, butyl acetate, cyclohexane, butyrolactone, tetraethylurea, isophorone, triethyl phosphate, carbitol acetate, propylene carbonate and the like can be exemplified, and a choice can be made properly in consideration of the polymer solubility or volatility, dielectric constant, viscosity and surface tension of a solvent. In addition, these solvents can be used alone, or two or more types of solvents can be mixed for use. When two or more types of solvents are mixed for use, by mixing the high-volatility solvent and the low-volatility solvent, the volatility of a polymer solution in the process of electrical field spinning can be controlled, thus is more preferred. As such a combination, N,N-dimethyl formamide and acetone, N,N-dimethylacetamide and acetone, N-methyl-2-pyrrolidone and acetone and the like can be exemplified. The mixing ratio of two or more types of solvents mixed for use is not particularly limited, and adjustment can be made properly in consideration of the physical properties of a required polymer solution, such as concentration or viscosity, volatility, electrical conductivity and surface tension. Thus, the fiber diameter or fiber morphology of the obtained nanofibers 8 can be controlled easily, and in addition, the regulation of the discharging amount of the solution in electrostatic spinning becomes easy, for example, the productivity of the nanofibers 8 can be increased by increasing discharging amount.

When the spinneret 1 for electrostatic spinning in the present embodiment is used for electrostatic spinning, in order to regulate the properties of the starting material fluid, an additive can be added. The varieties of additives are not particularly limited, and organic or inorganic salts and the like can be chosen properly. For example, when an ionic surfactant is added, the surface tension of the starting material fluid decreases, in addition, the electrical conductivity increases, consequently, in comparison with the case of electrostatically spinning the starting material fluid not added with the ionic surfactant, the appearance of spherical particles (beads) is little, the nanofibers 8 with small average fiber diameter can be obtained, and therefore is preferred. The amount of the added additive is also not particularly limited, and can be chosen properly in correspondence to the required property regulation effect of the starting material fluid; as a preferred range, 0.005 to 0.5 percent by mass of additive in the starting material fluid can be exemplified; and as a more preferred range, 0.01 to 0.3 percent by mass of additive in the starting material fluid can be exemplified.

When the spinneret 1 for electrostatic spinning in the present embodiment is used for electrostatic spinning, the polymer concentration of a starting material fluid is not particularly limited, and can be adjusted properly in consideration of the viscosity of the starting material fluid, the average fiber diameter or fiber morphology of the nanofibers 8 obtained by electrostatic spinning, productivity, etc.; as a preferred concentration range, 3 to 30 percent by mass of polymer can be exemplified; and as a more preferred range, 4 to 25 percent by mass of polymer can be exemplified. If the concentration of the polymer is 3 percent by mass or more, then bead structures almost cannot be seen, the nanofibers 8 with sufficiently small average fiber diameter can be obtained with satisfiable productivity, and therefore is preferred; if the concentration of the polymer is 4 percent by mass or more, then bead structures almost cannot be seen, the nanofibers 8 with satisfiable average fiber diameter can be obtained with sufficient productivity, and therefore is more preferred. In addition, if the concentration of the polymer is 30 percent by mass or less, then the viscosity becomes suitable for electrostatic spinning, the nanofibers 8 can be obtained with stable spinnability, and therefore is preferred; and if the concentration of the polymer is 25 percent by mass or less, then spinnability becomes more stable, therefore is more preferred.

When the spinneret 1 for electrostatic spinning in the present embodiment is used for electrostatic spinning, the viscosity of a starting material fluid is not particularly limited, a range from 10 cP to 5000 cP is preferred, and a range from 30 cP to 3000 cP is more preferred. By setting the viscosity of the starting material fluid as 10 cP or more, the spinnability is good, and beads cannot easily appear. By setting the viscosity of the starting material fluid as 5000 cP or less, the viscosity is low, so the starting material fluid can be supplied easily to each discharge hole 4 of the spinneret 1 for electrostatic spinning. Since the spinneret 1 for electrostatic spinning in the present embodiment is of the structure in which the protrusions 5 are provided with the discharge holes 4, by means of powerful electrical fields generated around the protrusions 5, the Taylor cones 7 show a stable behavior, and in particular, for example, low-viscosity starting material fluids with viscosities from 10 cP to 200 cP can be used to produce the uniform and small-fiber-diameter nanofibers 8.

EMBODIMENTS

The present invention is described in detail hereinafter according to embodiments, however, the explanation of the present invention is not limited to the following embodiments, and the present invention can be applied to various embodiments without departing from the scope of the subject matter. Moreover, a measurement method for the average fiber diameter of nanofibers shown in the embodiments is described below.

(Viscosity of Starting Material Fluid)

Under the conditions of a temperature of 25° C. and 30 percent of humidity, a viscometer RVDV-I Prime and a cone spindle CPE-41 produced by BROOKFIELD company were used to measure the viscosity of the following starting material fluid.

(Average Fiber Diameter)

A scanning electron microscope SU8020 produced by Hitachi High-Technologies corporation was used to observe nanofibers, and image analysis software was utilized to measure the diameters of 50 places of the nanofibers. The average value of the fiber diameters of 50 places of the nanofibers was set as an average fiber diameter.

(Spinning Stability)

Spinning stability was evaluated as follows. Electrostatic spinning was started. A case which adjacent Taylor cones were not in contact with one another for 2 or more hours, and nanofibers were continuously spinned from the Taylor cones was set as "⊚"; a case which the adjacent Taylor cones were not in contact with one another for 2 or more hours, but nanofibers were intermittently spinned from the Taylor cones was set as "O"; a case which the time taken until the adjacent Taylor cones were in contact with one another was within a range from 10 minutes to 2 hours, and nanofibers were continuously or intermittently spinned from the Taylor cones was set as "Δ"; and a case which the time taken until the adjacent Taylor cones were in contact with one another was 10 minutes or less, and nanofibers were continuously or intermittently spinned from the Taylor cones was set as "x".

Embodiment 1

A starting material fluid was prepared by dissolving Solef 21216 produced as polyvinylidene difluoride-hexafluoropropene (PVDF-HFP) resin by Solvay with a concentration of 8 percent by mass into N,N-dimethyl formamide, and sodium lauryl sulfate was added as an additive so as to change the concentration into 0.1 percent by mass. The viscosity of the starting material fluid was 461 cP. Then, the spinneret for electrostatic spinning in FIG. 1 provided with the protrusions was used over aluminum sheets arranged on the collecting electrodes as substrates to electrostatically spin the starting material fluid, so that PVDF-HFP nanofibers were produced. Moreover, the length of the spinneret was 100 mm, the thickness of the spinneret was 20 mm, the height of the spinneret was 40 mm, the height of each protrusion was 1.5 mm, each protrusion was shaped like a smooth cube, the protrusions were configured one-dimensionally, the shape of the outlet of each discharge hole was round, the aperture of the outlet of each discharge hole was 0.3 mm, the area (including the area of the outlet of the discharge hole) of each apex was 1 mm$^2$, one discharge hole was configured in each protrusion, the spinneret was provided with four protrusions, the distance between the adjacent discharge holes was 8 mm, and the aperture of the inflow port was 2 mm. In order to distribute the starting material fluid to each discharge hole from the inflow port, the internal space illustrated in FIG. 4 was formed in the spinneret for electrostatic spinning in the present embodiment. The length of the internal space was 80 mm, the thickness of the internal space was 10 mm, the height of the internal space was 35 mm, and the length of each discharge hole was 5 mm. The spinning conditions of the present embodiment were as follows: the supply amount of the starting material fluid supplied to each discharge hole (single hole) was 1.0 mL/hr, applied voltage was 45 kV, spinning distance was 150 mm, the temperature of a spinning space was 25° C., and the humidity of the spinning space was 30 percent. In the present embodiment, because the viscosity of the starting material fluid was high, the adjacent Taylor cones are not in contact with one another, so that stable spinning can be performed for 2 or more hours, so operability is sufficient. In addition, the nanofibers were spun continuously from the Taylor cones, so the PVDF-HFP nanofibers with sufficient quality can be obtained. The average fiber diameter of the obtained PVDF-HFP nanofibers was 78±15 nm.

Embodiment 2

A starting material fluid was prepared by dissolving Solef 21216 produced as PVDF-HFP resin by Solvay with a concentration of 6 percent by mass into N,N-dimethyl formamide, and sodium lauryl sulfate was added as an additive so as to change the concentration into 0.1 percent by mass. The viscosity of the starting material fluid was 162 cP. Then, the same spinneret for electrostatic spinning as in embodiment 1 was used over the aluminum sheets as substrates to electrostatically spin the starting material fluid with the same spinning conditions as in embodiment 1, so that PVDF-HFP nanofibers were produced. In the present embodiment, although the viscosity of the starting material fluid was low, powerful electrical fields can be generated around the smooth cube-shaped protrusions, so that the force which attracts Taylor cones toward the surfaces of collecting electrodes was enhanced, and consequently, the adjacent Taylor cones were not in contact with one another, so that stable spinning can be performed for 2 or more hours, so operability was sufficient. However, because the spinneret was not provided with the flow passages for distributing the starting material fluid inside, the nanofibers were spun intermittently from the Taylor cones, and therefore PVDF-HFP nanofibers with sufficient quality cannot be obtained. The average fiber diameter of the obtained PVDF-HFP nanofibers was 62±25 nm.

Embodiment 3

A starting material fluid was prepared with the same conditions as in embodiment 2. Then, the spinneret for electrostatic spinning in FIG. 1 provided with the protrusions was used over the aluminum sheets arranged on the collecting electrodes as substrates to electrostatically spin the starting material fluid, so that PVDF-HFP nanofibers were produced. The length of the spinneret was 100 mm, the thickness of the spinneret was 20 mm, the height of the spinneret was 40 mm, the height of each protrusion was 1.5 mm, each protrusion was shaped like a smooth cube, the protrusions were configured one-dimensionally, the shape of the outlet of each discharge hole was round, the aperture of the outlet of each discharge hole was 0.3 mm, the area (including the area of the outlet of the discharge hole) of each apex was 1 mm$^2$, one discharge hole was configured in each protrusion, the spinneret was provided with four protrusions, the distance between the adjacent discharge holes was 8 mm, and the aperture of the inflow port was 2 mm. In order to distribute the starting material fluid to each discharge hole from the inflow port, the spinneret for electrostatic spinning in the present embodiment was formed with the tournament-shaped flow passages illustrated in FIG. 6 in the interior by using the distributing plate illustrated in the three-dimensional diagram of FIG. 7. The sectional area of the recess of the distributing plate in a direction perpendicular to the flowing direction of the starting material fluid was 2 mm$^2$, the length of the recess in the flowing direction of the starting material fluid was 35 mm, the area of each hole running through the recess of the distributing plate was 0.5 mm$^2$, and the length of each hole running through the recess of the distributing plate was 3 mm. The spinning conditions of the present embodiment were the same as the spinning conditions of embodiment 1. In the present embodiment, although the viscosity of the starting material fluid was low, powerful electrical fields can be generated around the smooth cube-shaped protrusions, so that the force which attracts Taylor cones toward the surfaces of collecting electrodes was enhanced, and consequently, the adjacent Taylor cones were not in contact with one another, so that stable spinning can be performed for 2 or more hours, so operability was sufficient. In addition, since the spinneret was provided with the flow passages for distributing the starting material fluid inside, the nanofibers were spun continuously from the Taylor cones, and therefore PVDF-HFP nanofibers with sufficient quality can be obtained. The average fiber diameter of the obtained PVDF-HFP nanofibers was 64±13 nm.

Embodiment 4

Figure 9:
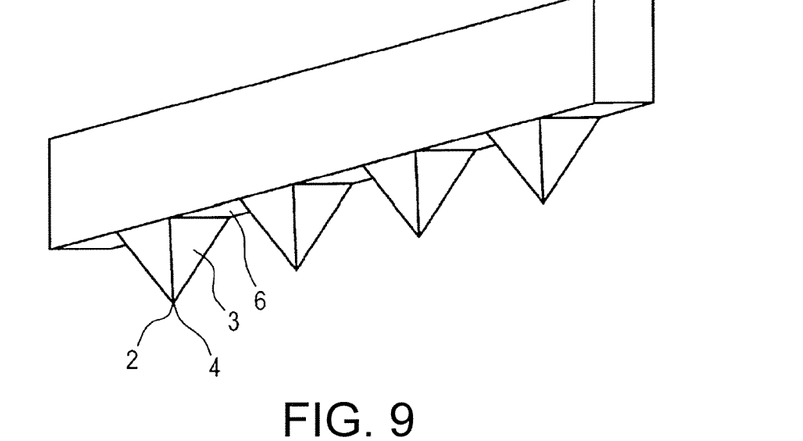
FIG. 9 is a three-dimensional diagram of a spinneret for electrostatic spinning having pyramidal protrusions.

A starting material fluid was prepared with the same conditions as in embodiment 2. The viscosity of the starting material fluid was 162 cP. Then, the spinneret for electrostatic spinning in FIG. 9 provided with the protrusions was used over the aluminum sheets arranged on the collecting electrodes as substrates to electrostatically spin the starting material fluid, so that PVDF-HFP nanofibers were produced. Moreover, the length of the spinneret was 100 mm, the thickness of the spinneret was 20 mm, the height of the spinneret was 40 mm, the height of each protrusion was 1.5 mm, each protrusion was shaped like a pyramid, the protrusions were configured one-dimensionally, the shape of the outlet of each discharge hole was round, the aperture of the outlet of each discharge hole was 0.3 mm, the area (including the area of the outlet of the discharge hole) of each apex was 1 $mm^2$, one discharge hole was configured in each protrusion, the spinneret was provided with four protrusions, the distance between the adjacent discharge holes was 8 mm, and the aperture of the inflow port was 2 mm. In order to distribute the starting material fluid to each discharge hole from the inflow port, the internal space illustrated in FIG. 4 was formed in the spinneret for electrostatic spinning in the present embodiment. The length of the internal space was 80 mm, the thickness of the internal space was 10 mm, the height of the internal space was 35 mm, and the length of each discharge hole was 5 mm. The spinning conditions of the present embodiment were the same as the spinning conditions of embodiment 1. In the present embodiment, although the viscosity of the starting material fluid was low, powerful electrical fields can be generated around the pyramid-shaped protrusions, so that the force which attracts Taylor cones toward the surfaces of collecting electrodes was enhanced, and consequently, the adjacent Taylor cones were not in contact with one another, so that stable spinning can be performed for 2 or more hours, so operability was sufficient. However, because the spinneret was not provided with the flow passages for distributing the starting material fluid inside, the nanofibers were spun intermittently from the Taylor cones, and therefore PVDF-HFP nanofibers with sufficient quality cannot be obtained. The average fiber diameter of the obtained PVDF-HFP nanofibers was 58±26 nm.

Embodiment 5

A starting material fluid was prepared with the same conditions as in embodiment 2. The viscosity of the starting material fluid was 162 cP. Then, the spinneret for electrostatic spinning in FIG. 9 provided with the protrusions was used over the aluminum sheets as substrates to electrostatically spin the starting material fluid, so that PVDF-HFP nanofibers were produced. Moreover, the length of the spinneret was 100 mm, the thickness of the spinneret was 20 mm, the height of the spinneret was 40 mm, the height of each protrusion was 1.5 mm, each protrusion was shaped like a pyramid, the protrusions were configured one-dimensionally, the shape of the outlet of each discharge hole was round, the aperture of the outlet of each discharge hole was 0.3 mm, one discharge hole was configured in each protrusion, the spinneret was provided with four protrusions, the distance between the adjacent discharge holes was 8 mm, and the aperture of the inflow port was 2 mm. In order to distribute the starting material fluid to each discharge hole from the inflow port, the spinneret for electrostatic spinning in the present embodiment was formed with the tournament-shaped flow passages illustrated in FIG. 6 in the interior by using the distributing plate illustrated in the three-dimensional diagram of FIG. 7. The sectional area of the recess of the distributing plate in a direction perpendicular to the flowing direction of the starting material fluid was 2 $mm^2$, the length of the recess in the flowing direction of the starting material fluid was 35 mm, the area of each hole running through the recess of the distributing plate was 0.5 $mm^2$, and the length of each hole running through the recess of the distributing plate was 3 mm. The spinning conditions of the present embodiment were the same as the spinning conditions of embodiment 1. In the present embodiment, although the viscosity of the starting material fluid was low, powerful electrical fields can be generated around the pyramid-shaped protrusions, so that the force which attracts Taylor cones toward the surfaces of collecting electrodes was enhanced, and consequently, the adjacent Taylor cones were not in contact with one another, so that stable spinning can be performed for 2 or more hours, so operability was sufficient. In addition, since the spinneret was provided with the flow passages for distributing the starting material fluid inside, the nanofibers were spun continuously from the Taylor cones, and therefore PVDF-HFP nanofibers with sufficient quality can be obtained. The average fiber diameter of the obtained PVDF-HFP nanofibers was 56±17 nm.

Embodiment 6

Figure 10:
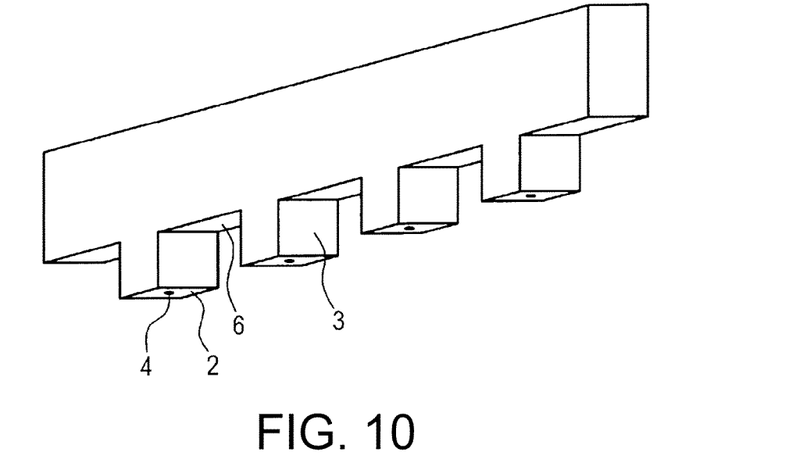
FIG. 10 is a three-dimensional diagram of a spinneret for electrostatic spinning having cuboid protrusions.

A starting material fluid was prepared with the same conditions as in embodiment 2. The viscosity of the starting material fluid was 162 cP. Then, the spinneret for electrostatic spinning in FIG. 10 provided with the protrusions was used over the aluminum sheets as substrates to electrostatically spin the starting material fluid, so that PVDF-HFP nanofibers were produced. Moreover, the length of the spinneret was 100 mm, the thickness of the spinneret was 20 mm, the height of the spinneret was 40 mm, the height of each protrusion was 1.5 mm, each protrusion was shaped like a cuboid, the protrusions were configured one-dimensionally, the shape of the outlet of each discharge hole was round, the aperture of the outlet of each discharge hole was 0.3 mm, one discharge hole was configured in each protrusion, the spinneret was provided with four protrusions, the distance between the adjacent discharge holes was 8 mm, and the aperture of the inflow port was 2 mm. In order to distribute the starting material fluid to each discharge hole from the inflow port, the internal space illustrated in FIG. 4 was formed in the spinneret for electrostatic spinning in the present embodiment. The length of the internal space was 80 mm, the thickness of the internal space was 10 mm, the height of the internal space was 35 mm, and the length of each discharge hole was 5 mm. The spinning conditions of the present embodiment were the same as the spinning conditions of embodiment 1. In the present embodiment, although the viscosity of the starting material fluid was low, powerful electrical fields can be generated around the cuboid-shaped protrusions, so that the force which attracts Taylor cones toward the surfaces of collecting electrodes was enhanced, and consequently, the adjacent Taylor cones were not in contact with one another, so that stable spinning can be performed for 2 or more hours, so operability was sufficient. However, because the spinneret was not provided with the flow passages for distributing the starting material fluid inside, the nanofibers were spun intermittently from the Taylor cones, and therefore PVDF-HFP nanofibers with sufficient quality cannot be obtained. The average fiber diameter of the obtained PVDF-HFP nanofibers was 65±28 nm.

Embodiment 7

A starting material fluid was prepared with the same conditions as in embodiment 2. The viscosity of the starting material fluid was 162 cP. Then, the spinneret for electrostatic spinning in FIG. 10 provided with the protrusions was used over the aluminum sheets as substrates to electrostatically spin the starting material fluid, so that PVDF-HFP nanofibers were produced. Moreover, the length of the spinneret was 100 mm, the thickness of the spinneret was 20 mm, the height of the spinneret was 40 mm, the height of each protrusion was 1.5 mm, each protrusion was shaped like a cuboid, the protrusions were configured one-dimensionally, the shape of the outlet of each discharge hole was round, the aperture of the outlet of each discharge hole was 0.3 mm, one discharge hole was configured in each protrusion, the spinneret was provided with four protrusions, the area (including the area of the outlet of the discharge hole) of each apex was 1 mm$^2$, the distance between the adjacent discharge holes was 8 mm, and the aperture of the inflow port was 2 mm. In order to distribute the starting material fluid to each discharge hole from the inflow port, the spinneret for electrostatic spinning in the present embodiment was formed with the tournament-shaped flow passages illustrated in FIG. 6 in the interior by using the distributing plate illustrated in the three-dimensional diagram of FIG. 7. The sectional area of the recess of the distributing plate in a direction perpendicular to the flowing direction of the starting material fluid was 2 mm$^2$, the length of the recess in the flowing direction of the starting material fluid was 35 mm, the area of each hole running through the recess of the distributing plate was 0.5 mm$^2$, and the length of each hole running through the recess of the distributing plate was 3 mm. The spinning conditions of the present embodiment were the same as the spinning conditions of embodiment 1. In the present embodiment, although the viscosity of the starting material fluid was low, powerful electrical fields can be generated around the cuboid-shaped protrusions, so that the force which attracts Taylor cones toward the surfaces of collecting electrodes was enhanced, and consequently, the adjacent Taylor cones were not in contact with one another, so that stable spinning can be performed for 2 or more hours, so operability was sufficient. In addition, since the spinneret was provided with the flow passages for distributing the starting material fluid inside, the nanofibers were spun continuously from the Taylor cones, and therefore PVDF-HFP nanofibers with sufficient quality can be obtained. The average fiber diameter of the obtained PVDF-HFP nanofibers was 62±19 nm.

Comparative Example 1

Figure 11:
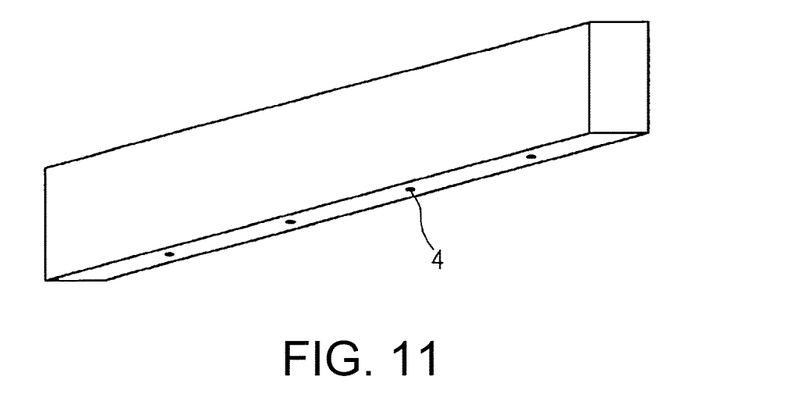
FIG. 11 is a three-dimensional diagram of a spinneret for electrostatic spinning having no protrusions.

A starting material fluid was prepared with the same conditions as in embodiment 2. The viscosity of the starting material fluid was 162 cP. Then, the spinneret for electrostatic spinning in FIG. 11 which was not provided with the protrusions was used over the aluminum sheets prepared as substrates to electrostatically spin the starting material fluid, so that PVDF-HFP nanofibers were produced. Moreover, the length of the spinneret was 100 mm, the thickness of the spinneret was 20 mm, the height of the spinneret was 40 mm, the discharge holes were configured one-dimensionally, the shape of each discharge hole was round, the aperture of the outlet of each discharge hole was 0.3 mm, the spinneret was provided with four discharge holes, and the distance between the adjacent discharge holes was 8 mm. In order to distribute the starting material fluid to each discharge hole from the inflow port, the internal space illustrated in FIG. 4 was formed in the spinneret for electrostatic spinning in the present comparative example. The length of the internal space was 80 mm, the thickness of the internal space was 10 mm, the height of the internal space was 35 mm, and the length of each discharge hole was 5 mm. The spinning conditions of the present comparative example were the same as the spinning conditions of embodiment 1. In the present comparative example, the viscosity of the starting material fluid was low, the spinneret without the protrusions was used, the force which attracts the Taylor cones toward the surfaces of the collecting electrodes cannot be enhanced sufficiently, and consequently, the adjacent Taylor cones were in contact with one another ten minutes after electrostatic spinning was started, so sufficient operability cannot be met. In addition, because the spinneret was not provided with the flow passages for distributing the starting material fluid inside, the nanofibers were spun intermittently from the Taylor cones, and therefore PVDF-HFP nanofibers with sufficient quality cannot be obtained. The average fiber diameter of the obtained PVDF-HFP nanofibers was 65±33 nm.

Comparative Example 2

A starting material fluid was prepared with the same conditions as in embodiment 2. The viscosity of the starting material fluid was 162 cP. Then, the spinneret for electrostatic spinning in FIG. 11 which was not provided with the protrusions was used over the aluminum sheets prepared as substrates to electrostatically spin the starting material fluid, so that PVDF-HFP nanofibers were produced. Moreover, the length of the spinneret was 100 mm, the thickness of the spinneret was 20 mm, the height of the spinneret was 40 mm, the discharge holes were configured one-dimensionally, the shape of each discharge hole was round, the aperture of the outlet of each discharge hole was 0.3 mm, the spinneret was provided with four discharge holes, and the distance between the adjacent discharge holes was 8 mm. In order to distribute the starting material fluid to each discharge hole from the inflow port, the spinneret was formed with the tournament-shaped flow passages illustrated in FIG. 6 in the interior by using the distributing plate illustrated in the three-dimensional diagram of FIG. 7. The sectional area of the recess of the distributing plate in a direction perpendicular to the flowing direction of the starting material fluid was 2 mm², the length of the recess in the flowing direction of the starting material fluid was 35 mm, the area of each hole running through the recess of the distributing plate was 0.5 mm², and the length of each hole running through the recess of the distributing plate was 3 mm. The spinning conditions of the present comparative example were the same as the spinning conditions of embodiment 1. In the present comparative example, the viscosity of the starting material fluid was low, the spinneret without the protrusions was used, the force which attracts the Taylor cones toward the surfaces of the collecting electrodes cannot be enhanced sufficiently, and consequently, the adjacent Taylor cones were in contact with one another ten minutes after electrostatic spinning was started, so sufficient operability cannot be met. However, since the spinneret was provided with the flow passages for distributing the starting material fluid inside, the nanofibers were spun continuously from the Taylor cones, and therefore PVDF-HFP nanofibers with sufficient quality can be obtained. The average fiber diameter of the obtained PVDF-HFP nanofibers was 63±21 nm.

The results of the above-mentioned experiments are gathered and shown in table 1.

TABLE 1

| | PVDF-HFP concentration | Shape of Protrusions | Flow Passages | Average Fiber Diameter | Spinning Stability |
|---|---|---|---|---|---|
| Embodiment 1 | 8 percent by mass | Smooth cube | None | 78 ± 15 nm | ◎ |
| Embodiment 2 | 6 percent by mass | Smooth cube | None | 62 ± 25 nm | ○ |
| Embodiment 3 | 6 percent by mass | Smooth cube | Yes | 64 ± 13 nm | ◎ |
| Embodiment 4 | 6 percent by mass | Pyramid | None | 58 ± 26 nm | ○ |
| Embodiment 5 | 6 percent by mass | Pyramid | Yes | 56 ± 17 nm | ◎ |
| Embodiment 6 | 6 percent by mass | Cuboid | None | 65 ± 28 nm | ○ |
| Embodiment 7 | 6 percent by mass | Cuboid | Yes | 62 ± 19 nm | ◎ |
| Comparative Example 1 | 6 percent by mass | No protrusions | None | 65 ± 33 nm | X |
| Comparative Example 2 | 6 percent by mass | No protrusions | Yes | 63 ± 21 nm | X |

The present application is based on the Japanese Patent Application 2014-159715 applied on Aug. 5, 2014 and the Japanese Patent Application 2015-098719 applied on May 14, 2014, and their contents are incorporated by references into the present application.

What is claimed is:

1. A spinneret for electrostatic spinning, comprising:
a structure of an electrically conductive metal material, wherein the structure is provided with a long-axis direction, a short-axis direction, and a thickness direction, one surface of the structure is provided with an inflow port for a spinning starting material fluid, a plurality of protrusions are formed on another surface of the structure and are aligned along the long-axis direction, each of the plurality of protrusions extends so as to protrude from the structure, the protrusions have, provided to apexes thereof, discharge holes for discharging the starting material fluid, and the pitch of the discharge holes exceeds 1 mm,
a first distributing plate comprising at least one recess on an upper surface thereof, a plurality of through-holes arranged in the at least one recess and extending in a thickness direction of the first distributing plate; and
at least a second distributing plate comprising at least two recesses on an upper surface thereof and a plurality of through-holes arranged in the at least two the recess and extending in a thickness direction of the second distributing plate, wherein the second distributing plate has twice the number of the plurality of through-holes than the first distributing plate;
wherein the first distributing plate and the at least a second distributing plate are arranged within a body of the structure, such that the at least one recess of the first distributing plate, the at least two recesses of the at least a second distributing plate, and the plurality of through-holes of the first distributing plate and the at least a second distributing plate form flow passages,
wherein the flow passages are configured to connect the inflow port with each of the discharge holes, have approximately equal total lengths, and are configured to distribute the starting material fluid from the inflow port to each of the discharge holes uniformly, wherein the differences between the total lengths of the flow passages from the inflow port to each of the discharge holes are within 10 percent,
wherein a cross-sectional area of each of the recesses in a direction perpendicular to a flowing direction of the starting material fluid is 0.1 mm² to 5 mm²,
wherein a cross-sectional area of each of the plurality of through-holes is 0.1 mm² to 1 mm²,
wherein the protrusions have a smooth cube shape,
wherein an area of the apex of each of the protrusions is within a range from 0.1 mm² to 100 mm², and
wherein heights of the spinneret relative to the apexes of the protrusions are different between adjacent protrusions.

2. The spinneret for electrostatic spinning according to claim 1, wherein the height of each protrusion is 0.1 mm or more.

* * * * *